(12) United States Patent
Higashi et al.

(10) Patent No.: US 6,195,524 B1
(45) Date of Patent: Feb. 27, 2001

(54) IMAGE FORMING APPARATUS

(75) Inventors: Toshikazu Higashi; Akira Takasu, both of Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/492,782

(22) Filed: Jan. 27, 2000

(30) Foreign Application Priority Data

Jan. 27, 1999 (JP) .................................................. 11-019144

(51) Int. Cl.$^7$ ............................ G03G 15/01; B41J 2/385; G01D 15/06
(52) U.S. Cl. ............................................. 399/301; 347/116
(58) Field of Search ...................................... 347/115, 116, 347/232, 234, 235, 248, 250; 399/49, 60, 298, 299, 301, 302

(56) References Cited

U.S. PATENT DOCUMENTS

| | | | |
|---|---|---|---|
| 4,485,982 | * 12/1984 | St. John et al. | 347/116 X |
| 5,510,885 | * 4/1996 | Mori et al. | 399/298 X |
| 5,875,380 | * 2/1999 | Iwata et al. | 399/301 |
| 6,008,826 | * 12/1999 | Foote et al. | 347/116 |
| 6,101,359 | * 8/2000 | Tamura | 399/301 |

FOREIGN PATENT DOCUMENTS

| | | |
|---|---|---|
| 6-253151 | 9/1994 | (JP) . |
| 8-286458 | 11/1996 | (JP) . |

* cited by examiner

*Primary Examiner*—Sandra Brase
(74) *Attorney, Agent, or Firm*—McDermott, Will & Emery

(57) ABSTRACT

The purpose of the present invention is to provide an image forming apparatus capable of excellent detection of the position of a toner mark on a transfer member without being influenced by transfer member thickness variation or position oscillation, and capable of high precision detection by eliminating errors due to differences in measurement timing by directly detecting the overlay dislocation of a plurality of toner layer with the same timing.

The image forming apparatus of the present invention attains these goals by detecting the distance from the sensor to the transfer member 6, and the distance from the sensor to the toner mark P, and determining the position of the toner mark P via the difference in the distances. In this way the positional dislocation of the toner mark P can be detected with excellent precision.

6 Claims, 7 Drawing Sheets

IMAGE FORMING APPARATUS

CROSS-REFERENCE TO RELATED APPLICATIONS

This application is based on Patent Application No. HEI 11-019144 filed in Japan, the content of which is hereby incorporated by reference.

BACKGROUND OF THE INVENTION

1. Field of the Invention

The present invention relates to an image forming apparatus provided with a function for detecting a toner marker on a transfer member supporting a toner image transferred from a photosensitive member, and specifically relates to multi-color overlay position dislocation in a color image forming apparatus.

2. Description of the Related Art

In conventional color image forming apparatuses, the density difference between a transfer member and various color toner marks transferred onto the belt or drum-like transfer member is detected via a photosensor, and the positional dislocation of the toner marks is detected by the output of the photosensors.

In such conventional apparatuses, however, photosensors generally detect the density difference between the transfer member and toner marks created by each process for colors Y, M, C, K, the center position of the mark is determined from the photosensor output to infer the position of each mark, and the degree of dislocation if any of the position of marks of each color from a standard position is discriminated and the amount of such dislocation is corrected during image formation. Essentially, although determination of the image overlay condition is best when the images have been overlaid, it is necessary to determine the dislocation from a standard value for detection data individually because the photosensors cannot recognize each color toner mark when being overlaid. In this case, it becomes difficult to suppress the influence of error components during detection, e.g., detection timing and speed fluctuation of the transfer member during transfer, errors of detection timing relating to timing differences and the like. Furthermore, since such detection is accomplished based on the magnitude of the photosensor output, there is concern that sensor output may be reduced by soiling of the sensor and the like.

SUMMARY OF THE INVENTION

An object of the present invention is to eliminate the previously described disadvantages by providing an image forming apparatus capable of excellent detection of the position of a toner mark on a transfer member without being influenced by transfer member thickness variation or position oscillation, and having a toner mark detection function capable of higher precision detection by eliminating errors due to differences in measurement timing by directly detecting the overlay dislocation of a plurality of toner layer with the same timing.

These objects are attained by the image forming apparatus of the present invention comprising an image-bearing body, a transfer member for supporting a toner image transferred from the image-bearing body, and a detecting unit for detecting toner marks on the transfer member, wherein the detecting unit detects the distance from the detecting unit to the transfer member and detects the distance from the detecting unit to the toner mark, and is provided with a determining unit that determines the toner mark position from the difference in these two distances.

In this construction, detection error elements caused by transfer member thickness variation and transfer member position variation during detection are eliminated because the toner mark positions are detected from the difference in the detected distance from the detecting unit to the transfer member and the detected distance from the detecting unit to the toner mark. Furthermore, toner mark position dislocation can be detected with excellent precision when toner layers of a plurality of color toner marks are overlaid on the transfer member.

The detection unit of the image forming apparatus of the present invention attaining the aforesaid objects is provided with at least two position sensing devices arranged in a direction perpendicular to the transport direction of the transfer member, wherein one position sensing device detects the toner mark, and the other position sensing device detects the transfer member, and the detecting unit detects the thickness of the toner mark via the difference in the detection values of the two position sensing devices.

In this way measurement errors due to detection timing are eliminated.

The determining unit of the image forming apparatus of the present invention attaining the aforesaid objects compares the difference between the detection values of the two position sensing devices relative to overlaid toner marks of at least two colors to a first reference level and a second reference level, discerns an area having a different comparison result as toner mark color dislocation, and determines the amount of dislocation and the amount of correction from the continuous time of the area of different comparison results.

In this way the position dislocation in color image formation can be corrected.

The detecting unit of the image forming apparatus of the present invention attaining the aforesaid objects detects the thickness of the toner marks by the difference in the voltage values output from the two position sensing devices.

The detecting unit of the image forming apparatus of the present invention attaining the aforesaid objects is a sensor comprising at one photoemitter device and two photoreceptor devices.

In this way detection errors due to undulation of the transfer member coinciding with a time difference of the light emission control of the photoemitter device can be eliminated because the toner mark and the transfer member are detected at the same time using the light emitted from a single photoemitter device.

The detecting unit of the image forming apparatus of the present invention attaining the aforesaid objects is two sensors comprising one photoemitter device and one photoreceptor device.

BRIEF DESCRIPTION OF THE DRAWINGS

These and other objects and features of the present invention will become apparent from the following description of the preferred embodiments thereof taken in conjunction with the accompanying drawings, in which.

In the following description, like parts are designated by like reference numbers throughout the several drawings.

DETAILED DESCRIPTION OF THE PREFERRED EMBODIMENTS

The preferred embodiments of the present invention are described hereinafter with reference to the accompanying drawings.

Figure 1:
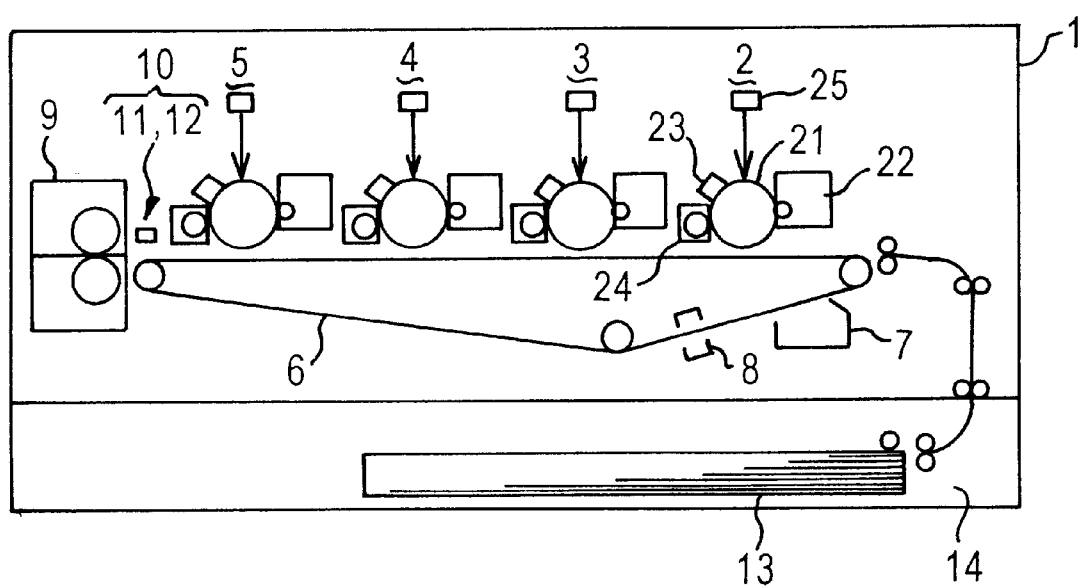
FIG. 1 shows the construction of the image forming apparatus of the present invention.

The image forming apparatus provided with a toner mark detection function of an embodiment of the present invention is described below with reference to the accompanying drawings. FIG. 1 shows the construction of a tandem-type color copier. The copier body 1 is provided with a plurality of color (Y, M, C, K) processing units 2~5, these units being arranged sequentially along the transport direction of a circular transfer belt (transfer member) 6, and each unit has arranged around a photosensitive drum 21, which functions as an image-bearing member, a toner developing device 11, a transfer device 23, a cleaning device 24, and an exposure device 25 for optical exposure of an image (the drawing only shows the reference numbers for unit 2). Opposite the transfer belt 6 are disposed a cleaning device 7 and discharger 8, and a fixing device 9 is provided for fixing a transferred toner image on a recording member. A detecting unit 10 is provided opposite the transfer belt 6 at the ultimate terminal end on the downstream side of the processing unit 5. The detecting unit 10 comprises two position sensing devices (PSD) 11 and 12. A recording sheet 13 is fed onto the top of the transfer belt 6 via a feeding device 14.

In the copier of the aforesaid construction A toner image created on the photosensitive drum 21 is transferred onto a recording sheet 13 transported on the transfer belt 6 via electrostatic adhesion. Each color toner image is overlaid via the processing units 2~5, to create a full color toner image. In order to correct the position dislocation of each color during transfer (generating color dislocation) when forming these images, standard toner patterns of each color (toner marks) are periodically transferred directly onto the transfer belt 6 with a different timing than the image formation to the recording sheet 13, and position correction is accomplished by detecting these toner marks via the PSD 11 and 12 of the detecting unit 10. The PSD 11 and 12 respectively detect the distance from the sensor to the transfer belt 6 and the distance from the sensor to the toner mark of each color on the transfer belt 6, thereby detecting the toner mark position and the thickness of the toner layer.

Figure 2:
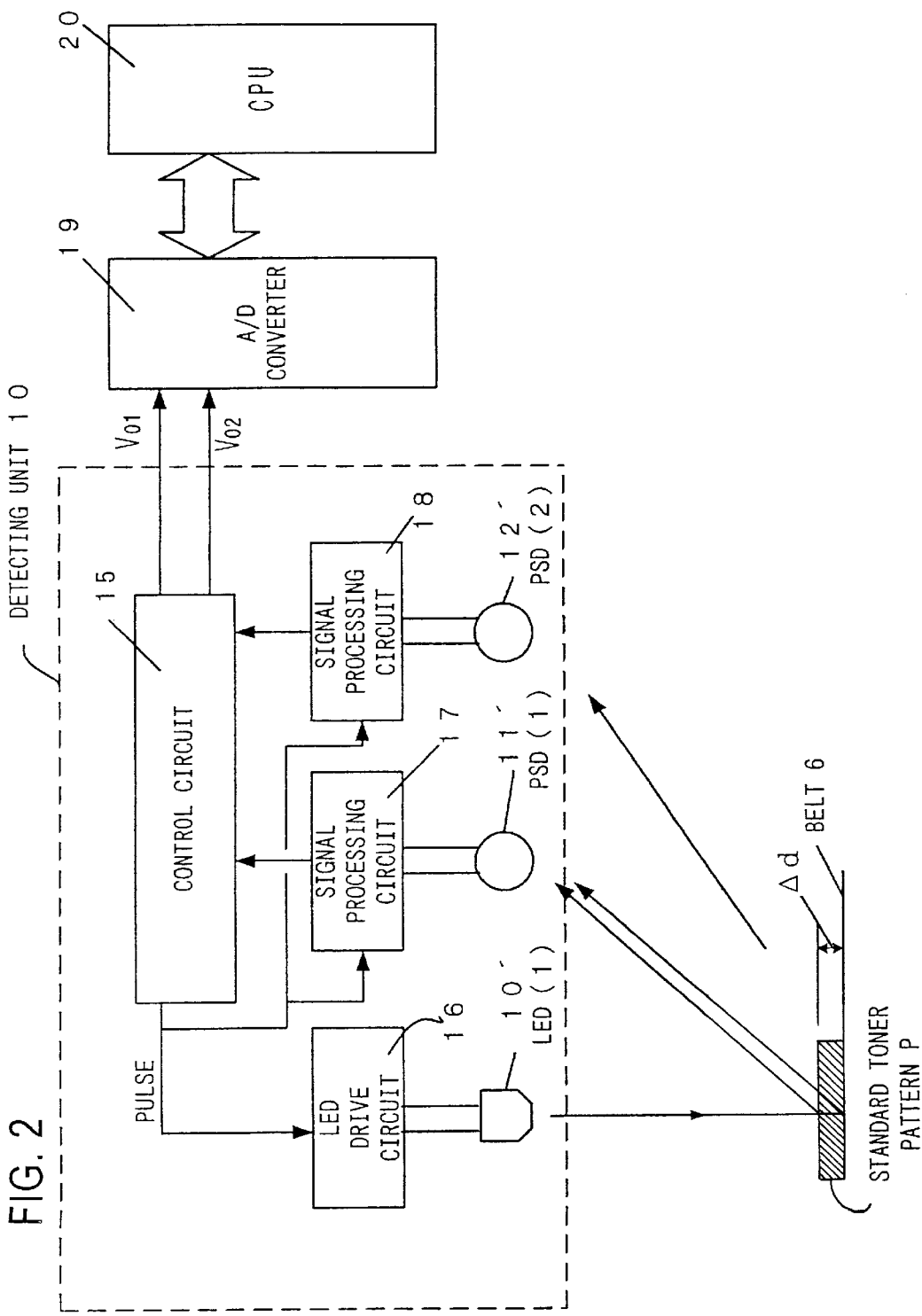
FIG. 2 shows the construction of the detecting unit in this image forming apparatus.
Figure 3:
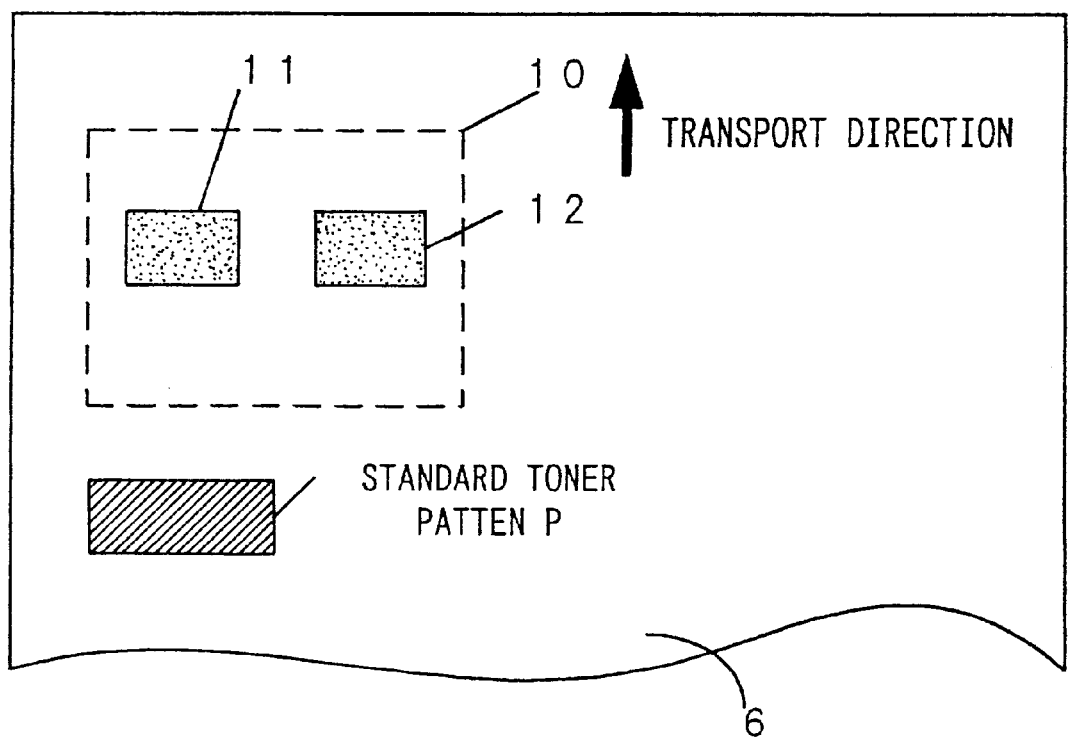
FIG. 3 is a layout diagram of the detecting unit.

The construction of the detecting unit 10 is shown in FIG. 2, and the sensor layout is shown in FIG. 3. The detecting unit 10 is provided with an LED (1) 10' as a single light-emitting element (photoemitting device), two PSD 11 and PSD 12 as photoreceptor devices, a control circuit 15, an LED drive circuit 16, and signal processing circuits 17 and 18. The PSD 11 and PSD 12 are aligned contiguously on a straight line in a direction perpendicular to the transport direction of the transfer belt 6, with the PSD 11 disposed so as to detect the toner mark (standard toner pattern P), and the PSD 12 disposed so as to detect the transfer belt 6 in the vicinity of the toner mark P. The light emitted from the LED 10' is diffused and reflected by the target object transfer belt 6 and the toner mark transferred onto the transfer belt 6, and part of the diffused light is received by the PSD 11 and PSD 12. The distance to the target object is measured from the ratio of the detection output of the sensors PSD 11 and PSD 12.

The detection distance range and resolution of the detecting unit 10 is variable by setting the sensitivity and pitch of the PSD photoreceptor devices and setting the optical lens and the like. In the present invention, the sensors can be set so as to be capable of measuring toner image thickness of several micrometers via a toner image formed by toner particles of several micrometers. The change in thickness Ad from the surface of the transfer belt 6 at the standard position is determined to be the toner mark thickness. However, even in a transfer belt 6 arranged at a constant distance from the sensors, the amount of change may not be accurately detected by the toner mark alone due to factors causing changes in thickness such as unevenness of belt thickness, undulation of the transfer belt 6 caused by a change in tension during transport, and degradation and soiling of the transfer belt and the like. In the present invention, as shown in FIG. 2, two sensors are provided for the same photoemitter device, wherein one sensor detects the diffused light from the toner image and the other sensor detects the diffused light from the transfer belt, to allow accurate detection of the toner thickness by detecting the difference between the distance to the toner and the distance to the transfer belt 6 at the standard toner pattern P position. A detection signal of the sensor unit 10 is output as an analog voltage proportional to the distance, and these signals are converted to digital data by an analog-to-digital (A/D) converter 19 and are input to a control microcomputer (CPU) 20 for signal processing.

Figure 4:
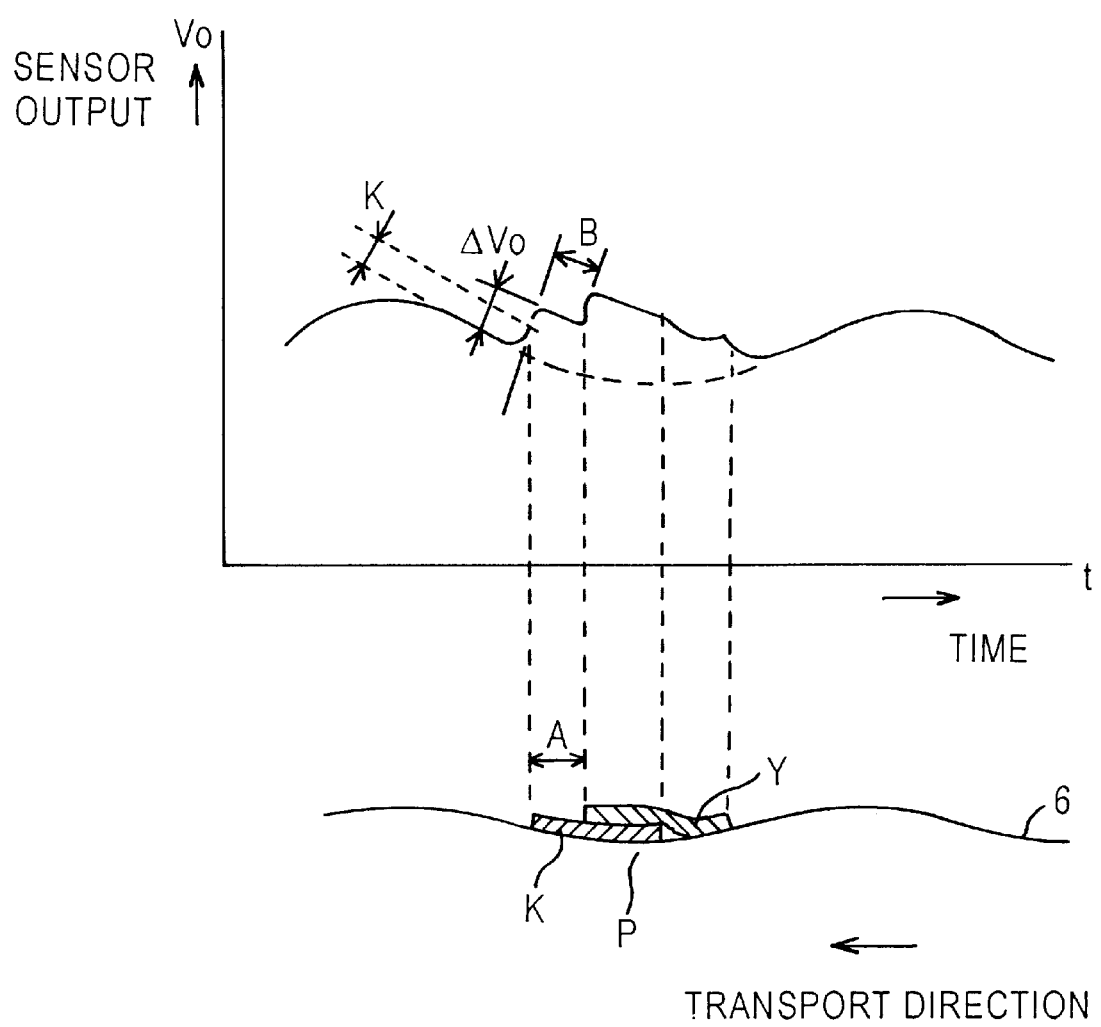
FIG. 4 shows the sensor output characteristics.

FIG. 4 shows the detection object toner mark formed on the transfer belt, and the change in sensor output when the toner mark is detected. The undulation of the sensor output corresponds to the change in position of the transfer belt 6. In this curve, the area of the broken line is the output waveform when the transfer belt 6 is detected by the PSD 12 corresponding to the period the toner mark is detected by the PSD 11. Position control of the toner mark is accomplished by detecting the degree of dislocation of the Y, M, C marks using the K (black) color as a standard, and correcting this amount of dislocation in the image data of each color. In the drawing, the K and Y marks are shown overlaid. The amount of dislocation of the image data is represented by area A on the transfer belt 6 in FIG. 4, and the output waveform is shown in area B. The area of sensor output change $\Delta V0$ is equivalent to the thickness of the K toner layer. Since the sensor detection output is not constant due to variation of thickness and undulation of the transfer belt 6, more precise thickness measurement is possible by using the difference between PSD 11 and PSD 12 as the toner mark thickness.

Figure 5:
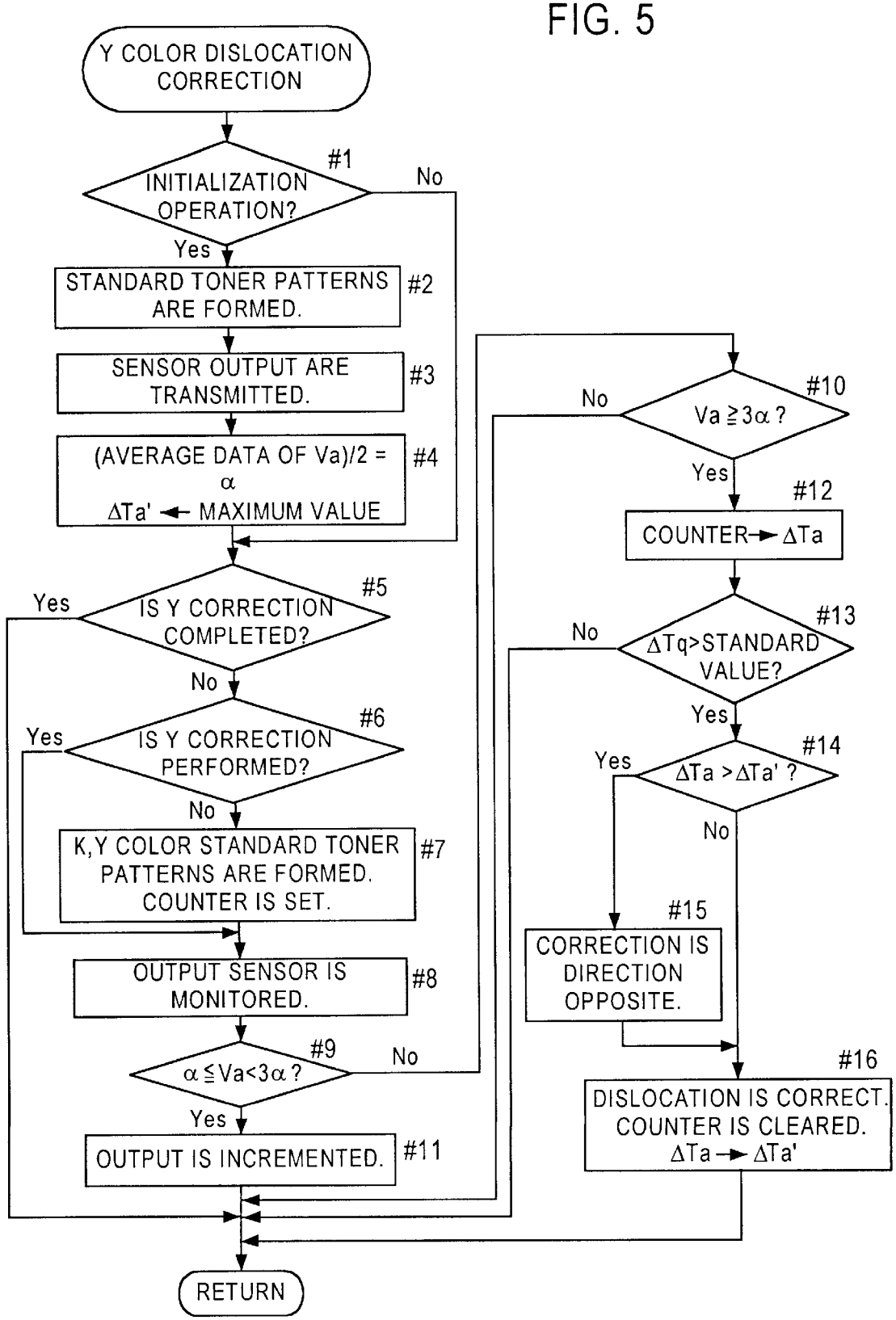
FIG. 5 is a flow chart of the color dislocation correction in the same apparatus.

FIG. 5 shows the control flow for color dislocation correction of the Y color as an example. Color dislocation correction control is accomplished independently from the normal image formation control before or during the image formation process via operation of the CPU 20. First, in the initialization operation, the single toner layer standard data are calculated for each color in the test mode, and standard toner patterns (toner marks) are separated formed on the transfer belt 6 based on these calculations (#1, #2). These toner marks are detected by the detecting unit 10, and the sensor output are transmitted to the CPU 20 (#3). The sensor output data Va is used as a determination standard value to determine the overlay condition of the toner layers, and the value of ½ the difference average data of the sensor output of each layer is calculated to determine the value $\alpha$. At this time, the correction dislocation amount ($\Delta$ta) used for the initial determination is set to a maximum value $\Delta$ta' (#4) in the correction mode.

Next, the Y color correction mode is entered (#5 and #6 NO), and the K color and Y color toner marks are overlaid together with a standard timing, and a clock counter is set (#7). Then, the output of sensor unit 10 is monitored (#8), and the sensor output voltage (Va in this instance) is compared to the previous determination standard value α to determine the toner layer overlay condition via the following relationships (#9).

| Equation 1 | |
|---|---|
| Va < α | (no toner layer) |
| α ≦ Va < 3α | (single toner layer) |
| 3α ≦ Va | (double toner layer) |

The sensor output level determination for detecting the amount of dislocation is described below.

When no toner layer is present, the determinations in step #9 is NO and in step #10 is NO, the process returns and thereafter Y correction is performed in #6, and #7 is skipped. When the timing indicates there is a single toner layer, the determination of step #9 is YES, and the counter value is incremented (#11). If the determination of #10 is NO, the toner layer has changed from a single layer to a double layer, and the continuous time to the second layer is measured by the count of the standard clock built into the CPU 20, and the count value Δta is set (#12). This value is the amount of dislocation. If the value Δta is less than a permitted standard value (#13: NO), it is deemed acceptable, whereas when the permitted standard value is exceeded (#13: YES), the overlay timing must be corrected.

In the case of two colors, when the thickness of each toner layer is identical, the direction of the color dislocation cannot be confirmed. First, in order to correct the amount of dislocation of the Y image data using K as a standard, unidirectional correction is performed relative to the determined amount of dislocation. A first correction time is Δta<Δta' since a maximum value is not entered for the value Δta' used for the determination, the determination of #14 becomes NO, the counter count is cleared, and the current Δta is entered for Δta' (#16). The process then returns, and this time the initialization operation is skipped, and steps #5 and below are repeated in the same manner. That is, the corrected toner marks are generated, and the sensor output are read by the CPU 20. During the second correction time, if Δta>Δta' (#14: YES), since the necessary correction amount has been added, correction in the opposite direction may now be performed (#15). BY determining the sensor output level after the aforesaid corrections, it can be known whether the amount of dislocation has increased or decreased, and in this way it is possible to determine the dislocation direction.

The size of the toner mark in the transport direction is made sufficiently large relative to the amount of dislocation. These marks are sequentially and repeated corrected for each color based on the K color so that all colors are within a dislocation range below a predetermined level relative to the K color. In this way the multi color overlays can be matched to obtain an optimum color image. The method for determining the amount of correction from the value Δta may be suitably set.

Figure 6:
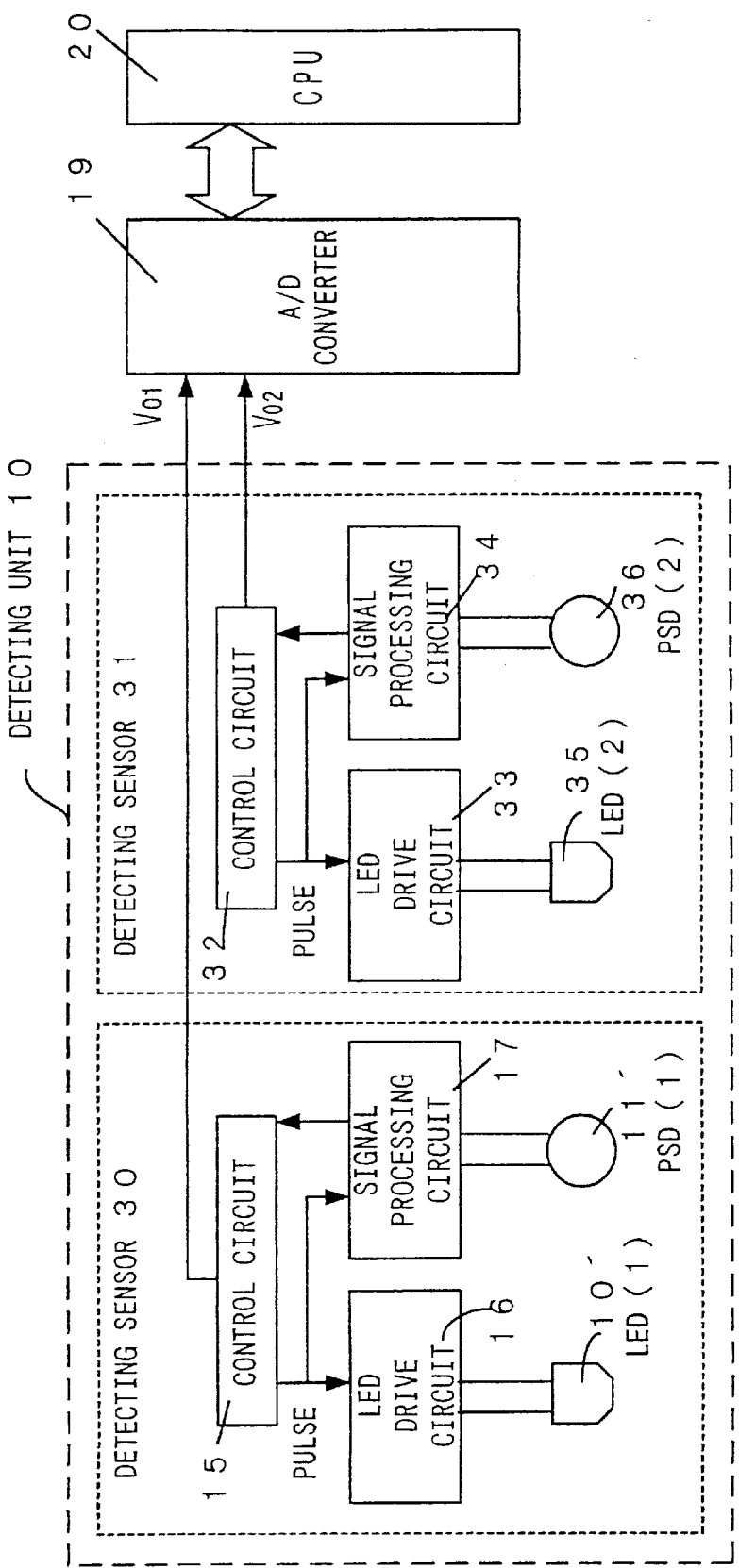
FIG. 6 shows the construction of a modification of the detecting unit in the same apparatus.
Figure 7:
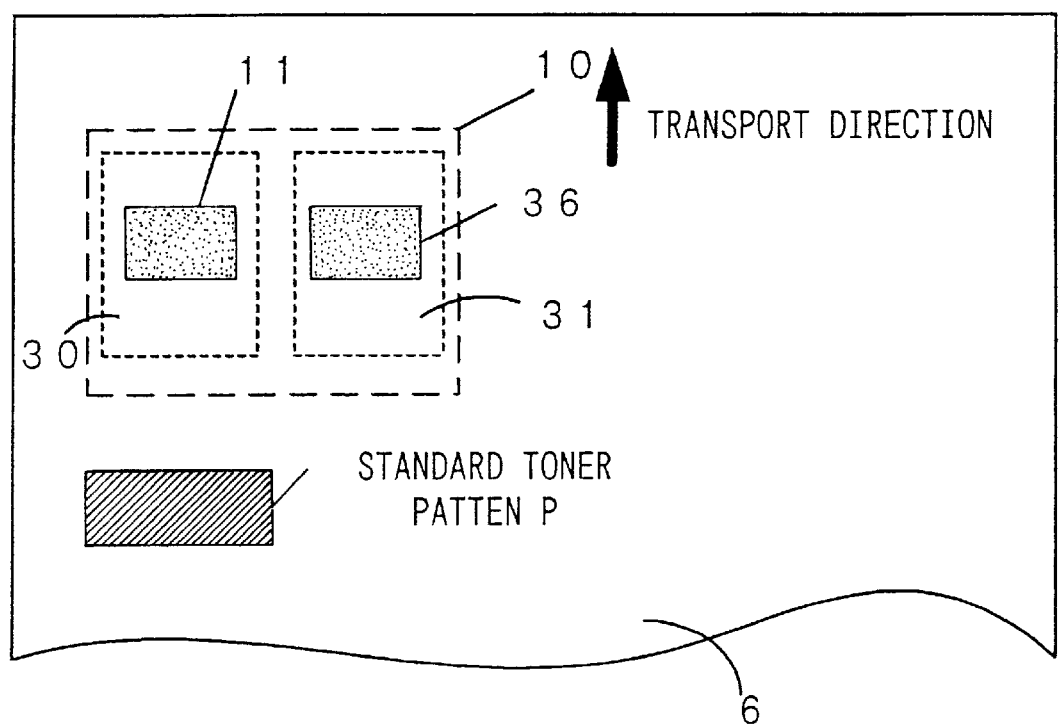
FIG. 7 shows a modification of the layout of the detecting unit.

The construction of the present invention is not limited to the previously described embodiment, and may be variously modified. For example, the detecting unit 10 of the image forming apparatus shown in FIGS. 6 and 7 comprises two sensors 30 and 31. The sensor 30 is provided with a single LED 10' as a light-emitting element (photoemitter device), a single PSD 11 as a photoreceptor device, a control circuit 15, an LED drive circuit 16, and a signal processing circuit 17. The sensor 32 is provided with a single LED 35 as a light-emitting element (photoemitter device), a single PSD 36 as a photoreceptor device, a control circuit 32, an LED drive circuit 33, and a signal processing circuit 34. The two sensors are aligned contiguously on a straight line in a direction perpendicular to the transport direction of the transfer belt 6, with the PSD 11 disposed so as to detect the toner mark (standard toner pattern P), and the PSD 36 disposed so as to detect the transfer belt 6 in the vicinity of the toner mark P. The light emitted from the LED 10' and the LED 35 are diffused and reflected by the target object transfer belt 6 and the toner mark transferred onto the transfer belt 6, and part of the diffused light is received by the PSD 11 and PSD 36. The distance to the target object is measured from the ratio of the detection output of the sensors PSD 11 and PSD 36.

Although the toner marks are formed on a transfer belt 6 in the aforesaid embodiments, the toner marks also may be formed on a transfer member other than a transfer belt, e.g., a transfer drum, transfer sheet or the like.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An image forming apparatus comprising:
   an image-bearing member;
   a transfer member for supporting a toner image transferred from the image-bearing member; and
   a detecting unit for detecting a toner mark on the transfer member, wherein the detecting unit detects the distance from the detecting unit to the transfer member and the distance from the detecting unit to the toner mark; and
   a determination unit for determining the toner mark position via the difference in the two detected distances.

2. The image forming apparatus claimed in claim 1, wherein the detecting unit has at least two position sensing devices aligned in a direction perpendicular to the transport direction of the transfer member, with one position sensing device detecting the toner mark, and the other position sensing device detecting the transfer member, such that the thickness of the toner mark is detected from the difference in the detection results.

3. The image forming apparatus claimed n claim 2, wherein the determination unit compares the difference between the detection values of the two detection sensors to a first standard level and a second standard level for at least two overlaid color toner marks, respectively, determines area of different comparison results as toner mark color dislocation, and determines the amount of dislocation and the amount of correction from the continuous time of the area of different comparison results.

4. The image forming apparatus claimed in claim 2, wherein the detecting unit detects the thickness of the toner mark from the difference between the voltage values output from the two position sensing devices.

5. The image forming apparatus claimed in claim 4, wherein the detecting unit is a single sensor comprising a single photoemitter device and two photoreceptor devices.

6. The image forming apparatus claimed in claim 4, wherein the detecting unit is two sensors comprising a single photoemitter device and a single photoreceptor device.

* * * * *